Patented Nov. 11, 1941

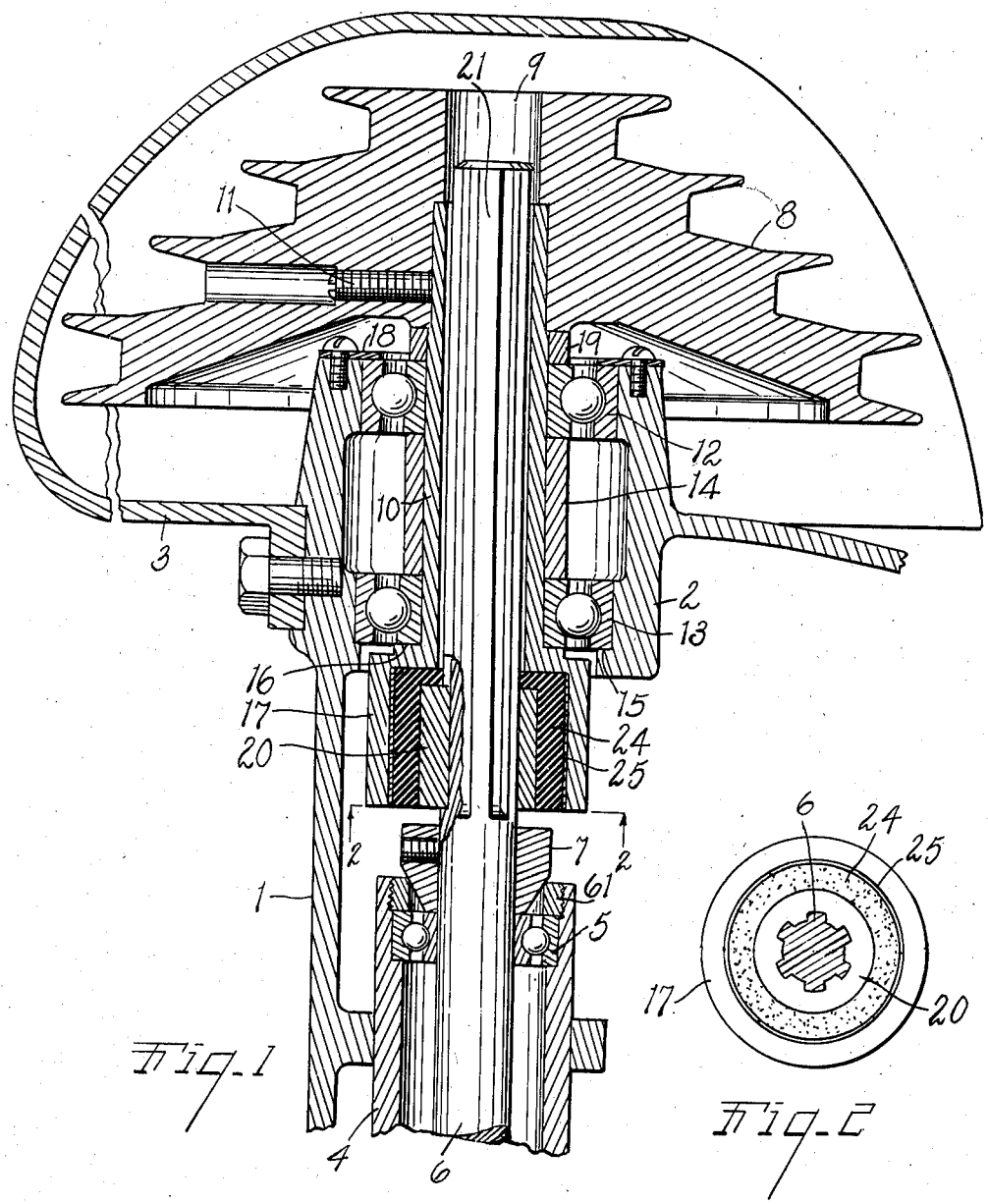

2,262,512

UNITED STATES PATENT OFFICE 2,262,512

DRILL PRESS

Henry E. Musselman, Kalamazoo, Mich., assignor to Atlas Press Company, Kalamazoo, Mich., a corporation of Michigan Application March 26, 1941, Serial No. 385,253

12 Claims. (Cl. 77—5)

The main objects of my invention are:

First, to provide a relatively low cost drill press having an improved flexible torque transmission or coupling between the pulley and spindle thereof to compensate for misalignment of the parts resulting in considerable vibration and noise.

Second, to provide a drill press construction of the foregoing character wherein the parts of the flexible joint or coupling are of a nature serving to substantially compact and axially shorten the spindle and the drill press as a whole, thereby effecting a considerable economy of materials and tending to eliminate whip of the spindle.

Third, to provide a press of the foregoing type having a flexible coupling associated therewith adjacent the slidable guide quill and spindle bearing to thereby reduce and substantially eliminate torsion of the spindle in operation.

Fourth, to provide a flexible torque transmission particularly adapted to a pulley driven drill press in which the axial dimension is substantially shortened and the driving pulley and coacting spindle driven element are maintained in predetermined axial spacing and prevented from axial separation, without the use of special restraining means for this purpose likely to result in increased noise in operation.

Fifth, to provide a flexible coupling of the foregoing character wherein vibration of the pulley as a result of belt pull is absorbed before it reaches the drill spindle.

Further objects and advantages pertaining to details and economies of construction and operation will appear from the description to follow. The invention is defined in the claims. A structure embodying the features of my invention is illustrated in the accompanying drawing, in which:

Fig. 1 is a fragmentary view in vertical section, illustrating structural details and the relation thereof in the assembly of the present invention.

Fig. 2 is a view in section on line 2—2 of Fig. 1, and is an end view of the flexible coupling between the sleeve and spindle of the present invention.

This invention relates generally to a torque transmission or coupling for a pulley driven drill press of inexpensive construction. In such presses it is impractical from a cost standpoint to machine to the extremely close tolerances necessary for a high degree of silence in operation and previously the same have been characterized by considerable vibration and noise in the pulley drive. As a result, it is highly desirable in structures of the foregoing character to provide some means to compensate for the misalignment. In certain previous structures, it has been proposed to employ a loose or sloppy fit between a pulley actuated part and coacting spindle driven part drivingly engaged thereby. This, however, is open to the objection that the loose fit is not only extremely noisy in operation, but also entails the use of additional mechanical means for preventing axial separation of the aforesaid loosely coacting parts, which additional elements add still further to the vibration and noise of operation, to say nothing of the inevitable wear on the parts leading to frequent attention and replacement during the life of the parts. In addition, such further elements substantially increase the actual dimension of the parts with resultant increase in bulkiness and the cost of production, a factor which must be borne in mind in the design of low cost machine tools of this type.

Generally stated, it is therefore the object of this invention to provide a press which is extremely silent in operation, which is very compact in its dimensions and which has provision for axially restraining the coacting driving and driven parts not subject to the foregoing objection. I accomplish these results by using a flexible coupling or joint intermediate the driving pulley and spindle driven thereby, the said joint being disposed internally of the tool head and intermediate and closely adjacent the bearings on the head for the pulley and spindle. Vibration of the pulley is also received and absorbed before it reaches the spindle.

Referring to the drawings, the reference numeral 1 in general indicates the tool carrying head of a drill press which latter is, in the illustrated embodiment, one of inexpensive construction as indicated above. This head has an enlarged, hollow, vertically elongated boss 2 at its upper end receiving certain pulley bearing provisions to be described, and a shield or guard 3 is bolted to the upper end of the head for enclosing the pulley and other spindle driving parts.

The usual axially reciprocal quill 4 is slidably guided in the head beneath the said boss and is provided interiorly with a bearing 5 which rotatably journals the tool spindle 6. A threaded washer 61 engages interiorly of the quill to restrain the outer bearing race, while a tapered collar 7 engages the inner race and is secured to the spindle by a set screw for axial reciprocation of the quill and spindle as a unit.

The reference numeral 8 designates a cone type belt pulley disposed above the head boss 2 and interiorly of the guard or shield 3. This pulley has an axial opening or bore 9 telescopingly receiving the spindle with substantial lateral clearance and an elongated axially extending tubular sleeve 10 to which the pulley is secured by a set screw 11, so that the pulley and sleeve rotate as a unit. The sleeve 10 has a very effective and silent rotatable mounting in hollow boss 2 by means of a pair of axially spaced bearings 12, 13 receivable internally of the boss, these bearings being axially spaced by an elongated tubular spacer element 14 surrounding sleeve 10, which spacer vertically sustains upper bearing 12. The outer race of lower bearing 13 is vertically sustained by an annular shoulder 15 interiorly of the boss 2, the inner race of this bearing likewise resting on a shoulder 16 constituted by an enlarged hollow, thimble-like lower portion 17 of the sleeve. An annular retaining plate 18 is secured to the upper end of boss 2 to hold the upper bearing 12 in place, and a washer-like spacer 19 serves to support pulley 8 on the inner race of this bearing in vertically spaced relation to the head boss. The pulley is recessed at its under side to accommodate the head boss and bearing parts.

The aforesaid enlarged lower portion 17 of the elongated sleeve 10, which is disposed immediately beneath the head boss and above the upper extremity of the stroke of quill 4, constitutes a driving element on the sleeve for transmitting driving torque from the latter and pulley 8 to the spindle, as will be described. This portion axially overlaps and internally receives in spaced radial relation the elongated sleeve-like spindle driving element 20 splined to and in slidable driving engagement with the upper splined end 21 of spindle 6. There is no lateral looseness at this driving connection. The splined parts have a freely slidable engagement without undue friction. For convenience I hereinafter designate the spindle driving element 20 by the term "driving quill." Pulley driven element 17 and the coacting interiorly disposed driving quill 20 are drivingly connected by means of an annular torque transmitting element or cushion 24 of elastic compressible material such as rubber or synthetic rubber substitute. For the purpose of ease and convenience of assembly, this cushion is preferably bonded or vulcanized to the internal quill 20 and to a surrounding cup or thimble 25, and I drivingly secure member 25 to element 17, so as to effect a torque transmitting engagement or coaction between the parts by means of a driving press fit internally of the element 17.

In this construction, it will be noted that the cushion, in addition to transmitting torque elastically, serves the further purpose of axially restraining and supporting the coacting joint elements 17, 20. Thus, there is no need for the provision of a fixed part on the head to engage beneath and support the quill or spindle driving member 20. It is floatingly restrained by the cushion without any frictional wear tending to detract from its operation and eventually requiring overhauling.

In the present construction, all vibration of the pulley is received and absorbed by the elastic cushioning element 24 before it reaches spindle 6, and the pulley is at all times subject to a tendency to center the same on the spindle. It should be especially noted that in the present construction, the point of actual driving connection for the spindle, namely, at the quill 20, is disposed interiorly of the machine head 1 and closely adjacent and between the bearing for the pulley sleeve 10 and the upper extremity of vertical travel of the guide quill 4. This substantially reduces torsion of the spindle in operation; moreover, it is obvious from an inspection of Fig. 1 that by disposing the aforesaid driving connection inside the head, the over-all vertical dimension of the press is substantially reduced, for the splined end of spindle 21 does not project above the top of pulley 8, even at the upper extremity of its stroke. The shortening of the spindle reduces whip thereof. Obviously, further reduction of the axial dimensions, as well as vibration clash and general noisy operation, is effected by elimination of auxiliary or special parts for maintaining the driving pulley and spindle actuating element driven thereby in predetermined axial relation. These considerations are of importance in the production of a low cost drill press or other machine tool, inasmuch as every reduction in dimension means a corresponding reduction in material cost.

The foregoing assembly is one which is very silent in operation indeed, notwithstanding its comparatively simple and inexpensive character. Actual tests show that it is as much as 65% freer from vibration and attendant noise and wear than a similar press unequipped with the torque coupling described. The parts are quickly and easily assembled and, because the permanent and friction-free character of the flexible coupling, require no servicing or replacement following the initial assembly.

The terms and expressions which have been herein employed are used as terms of description and not of limitation, and there is no intention in the use of such terms and expressions of excluding any equivalents of the features shown and described. It is recognized that various modifications are possible within the scope of the invention claimed.

Having thus described my invention, what I claim as new and desire to secure by Letters Patent is:

1. In a drill press of the type described having a hollow head, a spindle vertically reciprocal and rotatable in said head, and a pulley above said head coaxial with and telescopingly receiving said spindle, an elongated sleeve rigidly secured to said pulley and rotatably mounted at the top of said head, a spindle driving member splined on said spindle interiorly of said head and beneath the rotatable mounting for said sleeve, the latter having a driving portion externally concentric with and axially overlapping said driving member, and an elastic torque transmitting element connected externally to said splined member and internally to said sleeve to transmit torque therebetween, said elastic member having binding engagement with said portion and driving member to resist axial separation thereof and to constitute said pulley and driving member parts of an axially restrained unit, there being a guide quill for said spindle slidably mounted on the head and rotatably journaling said spindle at a point immediately beneath said torque transmitting connection.

2. In a drill press of the type described having a hollow head, a spindle vertically reciprocal and rotatable in said head, and a pulley above said head coaxial with and telescopingly receiving said spindle, an elongated sleeve rigidly secured to said pulley and rotatably mounted at the top of said head, a spindle driving member splined on said spindle interiorly of said head, said sleeve having a driving portion externally concentric with and axially overlapping said driving member, and an elastic torque transmitting element connected externally to said splined member and internally to said sleeve to transmit torque therebetween, said elastic member having binding engagement with said portion and driving member to resist axial separation thereof and to constitute said pulley and driving member parts of an axially restrained unit, there being a guide quill for said spindle slidably mounted on the head and rotatably journaling said spindle at a point closely adjacent and beneath said torque transmitting connection.

3. In a drill press of the type described having a hollow head, a spindle vertically reciprocal and rotatable in said head, and a pulley above said head coaxial with and telescopingly receiving said spindle, an elongated sleeve rigidly secured to said pulley and rotatably mounted at the top of said head, a spindle driving member splined on said spindle interiorly of said head, said sleeve having a driving portion externally concentric with and axially overlapping said driving member, and an elastic torque transmitting element connected externally to said splined member and internally to said sleeve to transmit torque therebetween, said elastic member having binding engagement with said portion and driving member to resist axial separation thereof and to constitute said pulley and driving member parts of an axially restrained unit.

4. In a drill press of the type described a head, a spindle vertically reciprocal and rotatable in said head, a pulley above said head coaxial with and telescopingly receiving said spindle, an elongated sleeve secured to said pulley and rotatably mounted at the top of said head, a spindle driving member splined on said spindle interiorly of said head and beneath the rotatable mounting for said sleeve, the latter having a driving portion concentric with and axially overlapping said driving member, and an elastic torque transmitting element drivingly connected to said splined driving member and to said sleeve to transmit torque therebetween, said elastic member having frictional binding engagement with said sleeve and driving member to resist axial separation thereof and to constitute said pulley and spindle driving member parts of an axially restrained unit.

5. In a drill press of the type described, a head, a spindle vertically reciprocal and rotatable in said head, a pulley above said head coaxial with and telescopingly receiving said spindle, a pulley driven sleeve rotatably mounted in said head, a spindle driving member splined on said spindle interiorly of said head, said pulley driven member being concentric with and axially overlapping said driving member, and an elastic torque transmitting element drivingly connected to said splined driving member and to said pulley driven sleeve to transmit torque therebetween, said elastic member having frictional binding engagement with said sleeve to resist axial separation thereof and to constitute said pulley and spindle driving member parts of an axially restrained unit.

6. In a drill press of the type described, a head, a spindle vertically reciprocal and rotatable in said head, a pulley above said head coaxial with said spindle, a pulley driven sleeve rotatably mounted in said head, a spindle driving member splined on said spindle, said pulley driven member being concentric with said driving member, and an elastic torque transmitting element drivingly connected to said splined driving member and to said pulley driven sleeve to transmit torque therebetween, said elastic member having binding engagement with said sleeve to resist axial separation thereof and to constitute said pulley and spindle driving member parts of an axially restrained unit.

7. In a drill press construction including a tool bearing head and a tool spindle slidable vertically in said head and pulley, means for rotatably mounting said pulley on said head including an axially elongated vertical bearing sleeve secured at its top end to said pulley and rotatably mounted in said head intermediate its length by a plurality of axially spaced bearings, said sleeve telescopingly receiving the upper end of said spindle with substantial lateral clearance, a tubular driven element splined on the upper end of said spindle and disposed beneath the rotatable bearing for said sleeve and interiorly of said head, said sleeve having a lower portion extending beneath said bearings and surrounding said driven element in spaced relation thereto, and a torque transmitting cushion element of elastic compressible material and of sleeve-like form interposed concentrically between said driven element and lower sleeve portion, and drivingly connected thereto to constitute a torque transmitting connection, said cushioning element having binding engagement with said driven element and sleeve portion to effectively resist axial displacement thereof and maintain said pulley and driven element together axially as a unit.

8. In a drill press construction including a tool bearing head and a tool spindle slidable vertically in said head and pulley, means for rotatably mounting said pulley on said head including an axially elongated vertical bearing sleeve secured at its top end to said pulley and rotatably mounted in said head intermediate its length, said sleeve telescopingly receiving the upper end of said spindle with substantial lateral clearance, a tubular driven element splined on the upper end of said spindle and disposed beneath the rotatable bearing for said sleeve and interiorly of said head, said sleeve having a lower portion surrounding said driven element in spaced relation thereto, and a torque transmitting cushion element of elastic compressible material and of sleeve-like form interposed concentrically between said driven element and lower sleeve portion, and drivingly connected thereto to constitute a torque transmitting connection, said cushioning element having binding engagement with said driven element and sleeve portion to effectively resist axial displacement thereof and maintain said pulley and driven element together axially as a unit.

9. In a drill press having a head provided with a pulley bearing adjacent the top thereof, a driving pulley journaled therein and a spindle guide quill slidable in said head in vertical alignment with said bearing, said quill having a spindle rotatably mounted adjacent the top thereof and there being means securing said quill and spindle together for vertical reciprocation, a hollow pulley driven element drivingly connected to said pulley and disposed in said head beneath said pulley bearing, said element being positioned in close adjacency to said quill at the upper end of the stroke of the latter, a sleeve-like spindle driving element telescopingly received internally of said first named element and splined to said spindle for rotative driving coaction therewith, and a cushioning element of elastic material concentric of and interposed between said elements and in binding engagement therewith to transmit torque therebetween, said last named binding engagement maintaining said elements in predetermined axial relationship so as to prevent axial separation of the spindle driving element from said pulley and pulley driven element.

10. In a drill press having a head provided with a pulley bearing adjacent the top thereof, a driving pulley journaled therein, and a spindle mounted in said head for vertical reciprocation, a hollow pulley driven element drivingly connected to said pulley and disposed in said head beneath said pulley bearing, a sleeve-like spindle driving element telescopingly received internally of said first named element and splined to said spindle for rotative driving coaction therewith, and a cushioning element of elastic material concentric of and interposed between said elements and secured thereto to transmit torque therebetween, said securement maintaining said elements in predetermined axial relationship so as to prevent axial separation of the spindle driving element from said pulley and pulley driven element.

11. In a drill press having a head provided with a pulley bearing, a driving pulley journaled therein, and a spindle guide quill slidable in said head in vertical alignment with said bearing, said quill having a spindle rotatably mounted adjacent the top thereof and said quill and spindle being vertically reciprocable together, a pulley driven element drivingly connected to said pulley and disposed in said head beneath said pulley bearing, said element being positioned in close adjacency to said quill at the upper end of the stroke of the latter, a spindle driving element splined to said spindle and elastic cushion means drivingly interposed between said elements and in fixed axial relation thereto to transmit torque therebetween and prevent axial separation of the spindle driving element from said pulley and pulley driven element.

12. In a drill press having a head provided with a pulley bearing, a driving pulley journaled therein, and a spindle reciprocable in the head, a pulley driven element drivingly connected to said pulley and disposed in said head beneath said pulley bearing, a spindle driving element splined to said spindle and elastic cushion means drivingly interposed between said elements and in fixed axial relation thereto to transmit torque therebetween and prevent axial separation of the spindle driving element from said pulley and pulley driven element.

HENRY E. MUSSELMAN.